US007155898B2

(12) United States Patent
Sota, Jr. et al.

(10) Patent No.: US 7,155,898 B2
(45) Date of Patent: Jan. 2, 2007

(54) THRUST VECTOR CONTROL SYSTEM FOR A PLUG NOZZLE ROCKET ENGINE

(75) Inventors: Charles G. Sota, Jr., Kirkland, WA (US); George J. Callis, Bothell, WA (US); Robert K. Masse, Redmond, WA (US)

(73) Assignee: Aerojet-General Corporation, Redmond, WA (US)

( * ) Notice: Subject to any disclaimer, the term of this patent is extended or adjusted under 35 U.S.C. 154(b) by 302 days.

(21) Appl. No.: 10/823,380

(22) Filed: Apr. 13, 2004

(65) Prior Publication Data
US 2005/0223695 A1    Oct. 13, 2005

(51) Int. Cl.
*F02K 9/90* (2006.01)
(52) U.S. Cl. ............... 60/230; 60/770; 239/265.19
(58) Field of Classification Search ............ 60/228, 60/230, 232, 233, 242, 771, 770; 239/265.19; 244/3.22
See application file for complete search history.

(56) References Cited

U.S. PATENT DOCUMENTS

| | | | |
|---|---|---|---|
| 3,192,714 A * | 7/1965 | Hickerson | ............... 60/230 |
| 3,489,373 A * | 1/1970 | Parilla | ............... 244/3.22 |
| 4,005,823 A | 2/1977 | Thayer | |
| 4,037,405 A | 7/1977 | Huenniger et al. | |
| 4,074,859 A | 2/1978 | Lowman, Jr. | |
| 4,384,690 A | 5/1983 | Brodersen | |
| 4,711,414 A | 12/1987 | Dunn | |
| 4,930,310 A | 6/1990 | McKevitt | |
| 5,078,336 A * | 1/1992 | Carter | ............... 244/3.22 |
| 5,082,181 A * | 1/1992 | Brees et al. | ............. 239/265.19 |
| 5,572,864 A | 11/1996 | Jones | |
| 6,131,858 A | 10/2000 | Dethienne et al. | |
| 6,145,299 A | 11/2000 | Fasano | |

OTHER PUBLICATIONS

Benson, T., "Liquid Rocket Thrust," *NASA Glenn Learning Technologies*, Jan. 29, 2003, < http://www.grc.nasa.gov/WWW/K-12/airplane/rockth.html> [retrieved Mar. 26, 2004].

Morcos, A.C., "Voice Coil Actuators for Use in Motion Control Systems," *Motion Magazine*, Fall 1998, <http://www.motion.org/9804morc.htm> [retrieved Feb. 2, 2004].

"Rocket Theory," *AU Space Reference Guide*, 2d ed., Aug. 1999, Appendix E, pp. 5-1-5-21.

* cited by examiner

*Primary Examiner*—L. J. Casaregola
(74) *Attorney, Agent, or Firm*—Christensen O'Connor Johnson Kindness PLLC

(57) ABSTRACT

A thrust vector control system for a plug nozzle rocket engine for propelling and maneuvering a vehicle is disclosed. The plug nozzle rocket engine includes a housing having a nozzle throat, a plug disposed within the housing and positioned within the nozzle throat to define a space between the plug and the nozzle throat, and a thrust diverter moveably disposed relative to the housing to define an asymmetric pressure distribution along the plug for thrust-vectoring. In one embodiment, the thrust diverter is normally biased to a non-thrust-vectoring position, but is moveable in a plane substantially perpendicular to an axis extending longitudinally through the plug.

24 Claims, 7 Drawing Sheets

THRUST VECTOR CONTROL SYSTEM FOR A PLUG NOZZLE ROCKET ENGINE

FIELD OF THE INVENTION

This invention relates to thrust vector control systems for thrusters used for propelling and maneuvering vehicles, and more specifically to thrust vector control systems for plug nozzle rocket engines.

BACKGROUND OF THE INVENTION

Plug nozzle rocket engines are common engines in the field of rocket, missile, and space vehicle propulsion. The exhaust flow from a conventional annular plug nozzle throat is largely symmetrical and not easily redirected for the purpose of altering the thrust vector to control attitude or direction of the vehicle on which the engine is mounted.

Traditionally, angular displacement of a thrust vector has required angular displacement of the entire rocket engine. For example, one type of thrust vector control system is a gimbaled thruster. The gimbaled thruster moves about a point of rotation relative to the vehicle on which it is mounted to redirect the thrust vector of the vehicle. This system requires precise gimballing mechanisms. These mechanisms are exposed to large forces, require high power to achieve rapid response, are heavy, complex, and costly.

Another thrust vector control system includes a plurality of thrusters arranged at angles diverging to opposite sides of a vehicle. For example, see U.S. Pat. No. 4,384,690, entitled "Thrust Vector Control for Large Deflection Angles," issued to Broderson. A supply of thrust producing gas is ducted to the thrusters from a gas generator via ducts. A guidance system provides control signals to those valves to effect pulse duration modulations of the thrusters. The combined vector of the total axial thrust is the sum of the axial components of all of the individual thrust vectors from the plurality of thrusters. This system is complicated and expensive.

Therefore, there exists a need for an improved plug nozzle rocket engine having a reliable, fast response, low power, low mass, low cost, rapid, effective, and simple mechanism for altering the thrust vector of the engine.

SUMMARY OF THE INVENTION

One embodiment of a thrust vector control system for a plug nozzle rocket engine formed in accordance with the present invention includes a housing having a nozzle throat, a plug disposed relative the housing and positioned within the nozzle throat to define a space between the plug and the nozzle throat, and a thrust diverter moveably disposed relative to the housing to define an asymmetric pressure distribution along the plug for thrust-vectoring.

In one embodiment, the thrust diverter is normally biased to a non-thrust-vectoring position, but is moveable in a plane substantially perpendicular to an axis extending longitudinally through the plug.

In another embodiment of the present invention, a thrust vector control system for a rocket engine includes a housing having a nozzle throat, and a plug translationally mounted within the housing and positioned within the nozzle throat to define a space between the plug and the nozzle throat. The thrust vector control system further includes a thrust diverter moveably disposed relative to the housing to angularly deflect thrust relative to the plug for thrust-vectoring.

In still another embodiment of the present invention, a thrust vector control system includes means for generating thrust and means for controlling the thrust level. The means for controlling the thrust level can be operative between full on and full off flow positions. The thrust vector control system further includes means for thrust-vectoring, the means for thrust-vectoring selectively producing an apparent angular thrust vector deflection by introducing surface pressure asymmetry along the length of the plug.

In yet another embodiment of the present invention, a thrust vector control system for a rocket engine includes a housing having a nozzle throat, and a plug disposed relative to the housing and positioned within the nozzle throat to define a space between the plug and the nozzle throat. The plug is moveable within the housing between an open position and a closed position relative to the nozzle throat. The thrust vector control system further includes a thrust diverter, including a plate having an opening with a diameter, and first and second actuators coupled to the plate. The plate is moveably disposed relative to the housing in a plane substantially perpendicular to an axis extending longitudinally through the plug. The plate is normally biased to a non-thrust-vectoring position. The first and second actuators selectively move the plate relative to the housing such that the plate is moveable to a thrust-vectoring position. When the plate is in a thrust-vectoring position, the plate defines an asymmetric surface pressure distribution along the plug.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
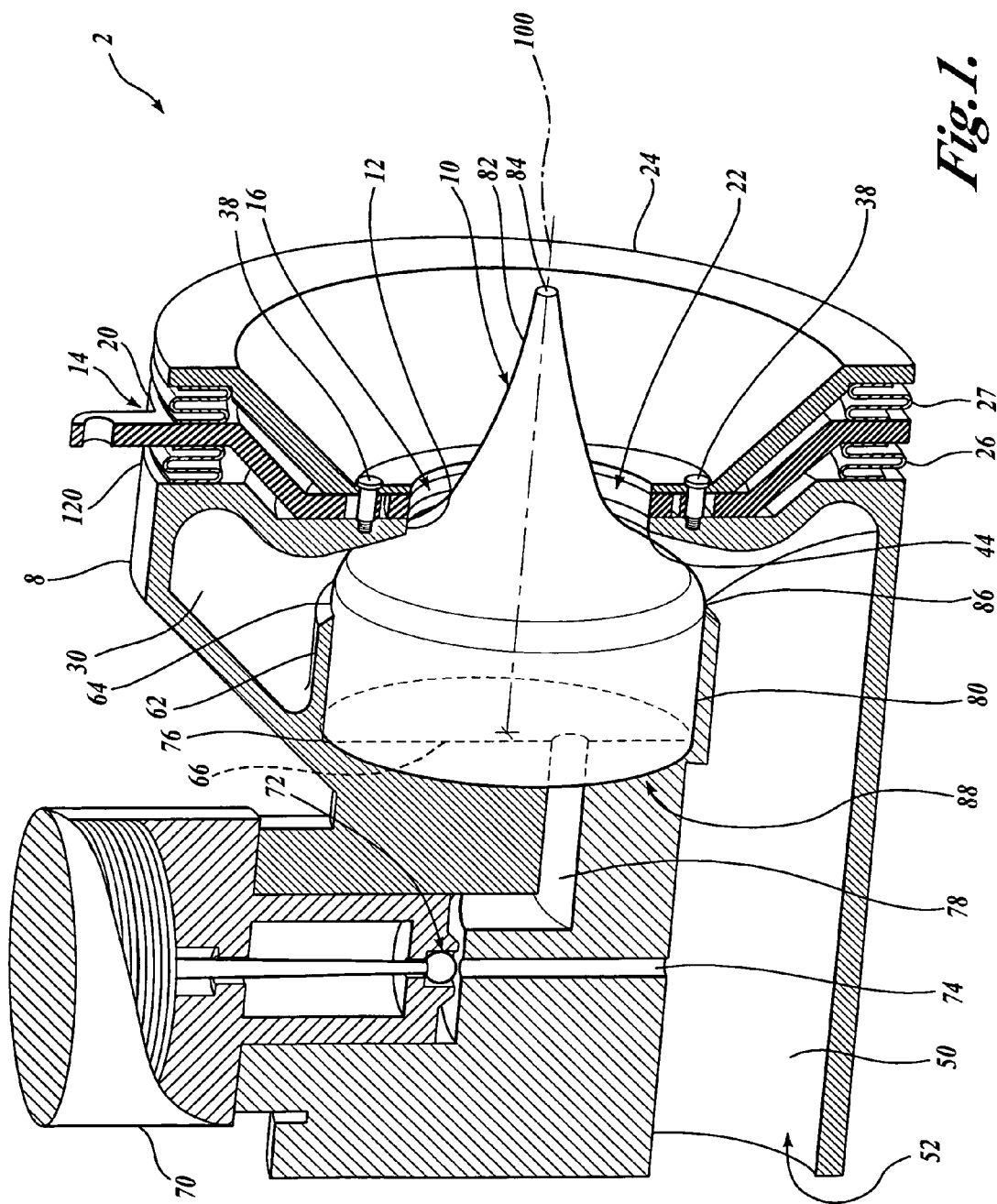
FIG. 1 is a perspective view in partial cross-section of a plug nozzle rocket engine according to the present invention, including a housing, a plug, and a thrust diverter.
Figure 2:
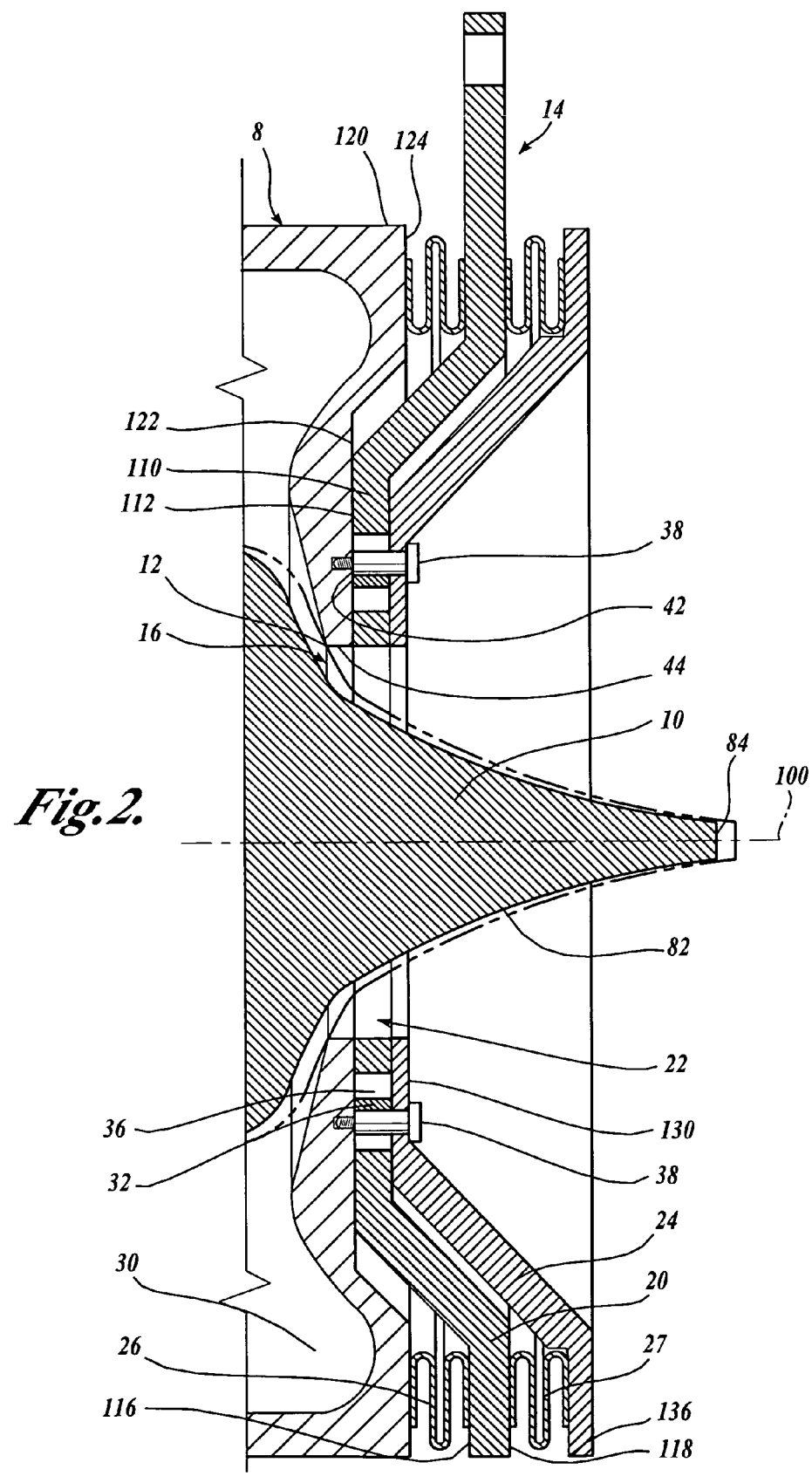
FIG. 2 is an enlarged cross-sectional view of a plug nozzle rocket engine shown in FIG. 1 showing the plug and the thrust diverter according to the present invention.

Referring to FIGS. 1 and 2, a plug nozzle rocket engine 2 includes a housing 8 having a plug nozzle throat 12 located at the rearward end 120 of the housing 8. Located centrally in the housing 8 is a cylindrical chamber 62 having an open rearward end 64 and a closed forward end 66. Surrounding the cylindrical chamber 62 is an annular plenum cavity 30. The plenum cavity 30 has an annular exit, or nozzle throat 12, positioned rearwardly of the rearward end 64 of the cyclindral chamber 62. The nozzle throat 12 begins at an annular rim 44 of the plenum cavity 30 and is the outlet for gas (or exhaust) from the housing 8. The nozzle throat 12 is annular in configuration and is oriented perpendicularly to the longitudinal axis 100 of the cylindrical chamber 62. The nozzle throat 12 is located concentrically about the longitudinal axis 100 of the cylindrical chamber 62. The nozzle throat 12 has a diameter less than the diameter of the cyclindral chamber 62. A propellant or gas supply duct 50 extends forwardly from the plenum cavity 30 and connects with a propellant supply (not shown). A pilot stage gas channel 74 extends from the gas supply duct 50 to the forward end 66 of the cylindrical chamber 62. A conventional pilot stage valve 72 opens and closes the pilot stage gas channel 74 in a conventional manner, as will be described in detail below, in response to an operative pilot stage command.

A plug 10 is mounted for fore and aft movement in the cylindrical chamber 62. In the illustrated embodiment of FIG. 1, the plug has a forward cylindrical portion 80 and a rearward conically-shaped portion 82. The cylindrical portion 80 is mounted for fore and aft movement along the longitudinal axis 100 of the cylindrical chamber 62. The rearward portion of the plug 10 comprises a conically-shaped portion 82 that extends from the rearward edge 86 of the cylindrical portion 80 and tapers rearwardly and radially inwardly to a rearward plug tip 84. The nozzle throat 12 has a diameter greater than the diameter of the plug 10 at its rearward tip 84. The conically-shaped portion 82 of the plug 10 extends through the nozzle throat 12.

The plug 10 is suitably disposed within the housing 8 and positionable within the nozzle throat 12 to control thrust level. The plug 10 can be translationally or reciprocally mounted within the housing 8 and positioned within the nozzle throat 12 to define a space between the plug 10 and the nozzle throat 12. Referring to FIGS. 1 and 2, when propellant gas is sup supplied to the gas supply duct 50, it enters the plenum cavity 30 and forces the plug 10 forwardly (as shown in FIG. 2) so that it seats against the forward end 66 of the cylindrical chamber 62 (as shown in FIG. 1). The plug 10 is forced forwardly provided the pilot stage valve 72 is in a closed position such that no propellant gas enters the pilot stage cavity 76 between the forward end 66 of the cylindrical chamber 62 and the forward end 88 of the plug 10.

When the pilot stage valve 72 is in an open position, propellant gas travels through the pilot stage channel 74, through the pilot stage gas duct 78, and enters the pilot stage cavity 76. Gas in the pilot stage cavity 76 forces the plug 10 rearwardly so that the rearward conically-shaped portion 82 of the plug 10 seals against the inner annular rim 44 of the nozzle throat 12 (as shown in dashed outline in FIG. 2) to substantially prevent propellant gas, or exhaust, from exiting through the annular space 16 between the plug 10 and the nozzle throat 12. The rearward conically-shaped portion 82 of the plug 10 seals against the nozzle throat 12 where the cross-section of the plug 10 has a diameter substantially equal to the diameter of the nozzle throat 12.

Gas can be supplied to the gas supply duct 50 from a high-pressure gas generator. The gas generator may be capable of providing a substantially constant mass flow rate of gas to the gas inlet 52. Gas that enters the plenum cavity 30 exits (as exhaust) through the annular space 16 between the nozzle throat 12 and the plug 10. The effect of the ejected exhaust appears as a reaction thrust, acting in a direction and with a force equal and opposite to the exhaust direction and force. This thrust propels the plug nozzle rocket engine 2 and any vehicle on which the rocket engine 2 is mounted.

Figure 3:
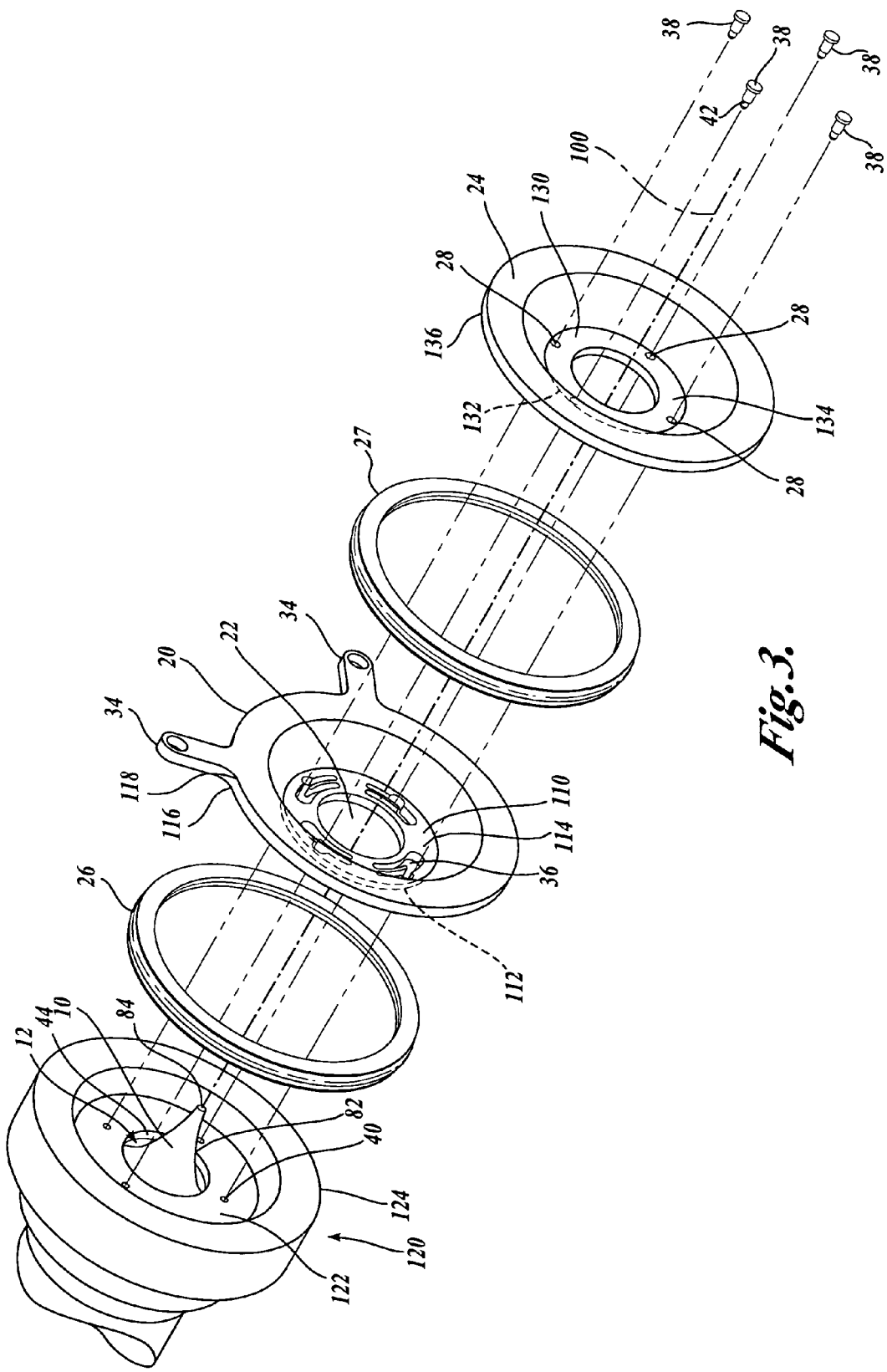
FIG. 3 is an isometric exploded view of the plug and the thrust diverter of FIG. 1.

Still referring to FIGS. 1 and 2, a thrust diverter 14 is positioned on the rear portion 120 of the housing 8 of the rocket engine 2. In the illustrated embodiment of FIGS. 1 and 2, the thrust diverter 14 is moveably or slidably disposed relative to the housing 8 and the nozzle throat 12. Referring to FIGS. 2 and 3, one suitable example of a thrust diverter 14 includes a dish-shaped plate 20 having a planar central portion 110. Referring to FIG. 3, the planar central portion 110 of the dish-shaped plate 20 has a planar forward surface 112 and a planar rearward surface 114. The planar forward surface 112 of the planar central portion 110 seats against a rearward planar surface 122 of the housing 8 that is oriented perpendicularly to the longitudinal axis 100 of the plug 10. The housing rearward planar surface 122 is located on the aft surface of the housing 8 immediately behind the nozzle throat 12. A first bellows seal 26 provides an annular seal between the outer edge of the rearward planar surface 122 of the housing 8 and the forward outer edge 116 of the plate 20. As will be described in more detail, a retention plate 24 is situated rearwardly of the plate 20 to hold the plate 20 in position.

The plate 20 has a center opening 22 that is centered about and normally concentric with the nozzle throat 12. The plate center opening 22 has a diameter substantially equal to the diameter of the nozzle throat 12. The conically-shaped portion 82 of the plug 10 extends through the nozzle throat 12 and the plate center opening 22. The plate 20 is normally biased to a position in which it is in direct alignment with the nozzle throat 12. As will be described in more detail, the plate 20 can be moved so as to offset the center opening of the plate 22 relative to the nozzle throat 12.

Another suitable example of a thrust diverter 14 for producing resultant asymmetrical expansion waves and pressure distribution on the plug 10 includes a substantially flat plate with a center opening that is centered about and normally concentric with the nozzle throat 12. Other suitable thrust diverters include shutters for shutter control or cam plates of pre-determined shapes, or any other suitable diverts capable of producing asymmetric expansion waves on the plug 10. Still other suitable thrust diverters include rounded or semi-spherical plates.

Figure 7:
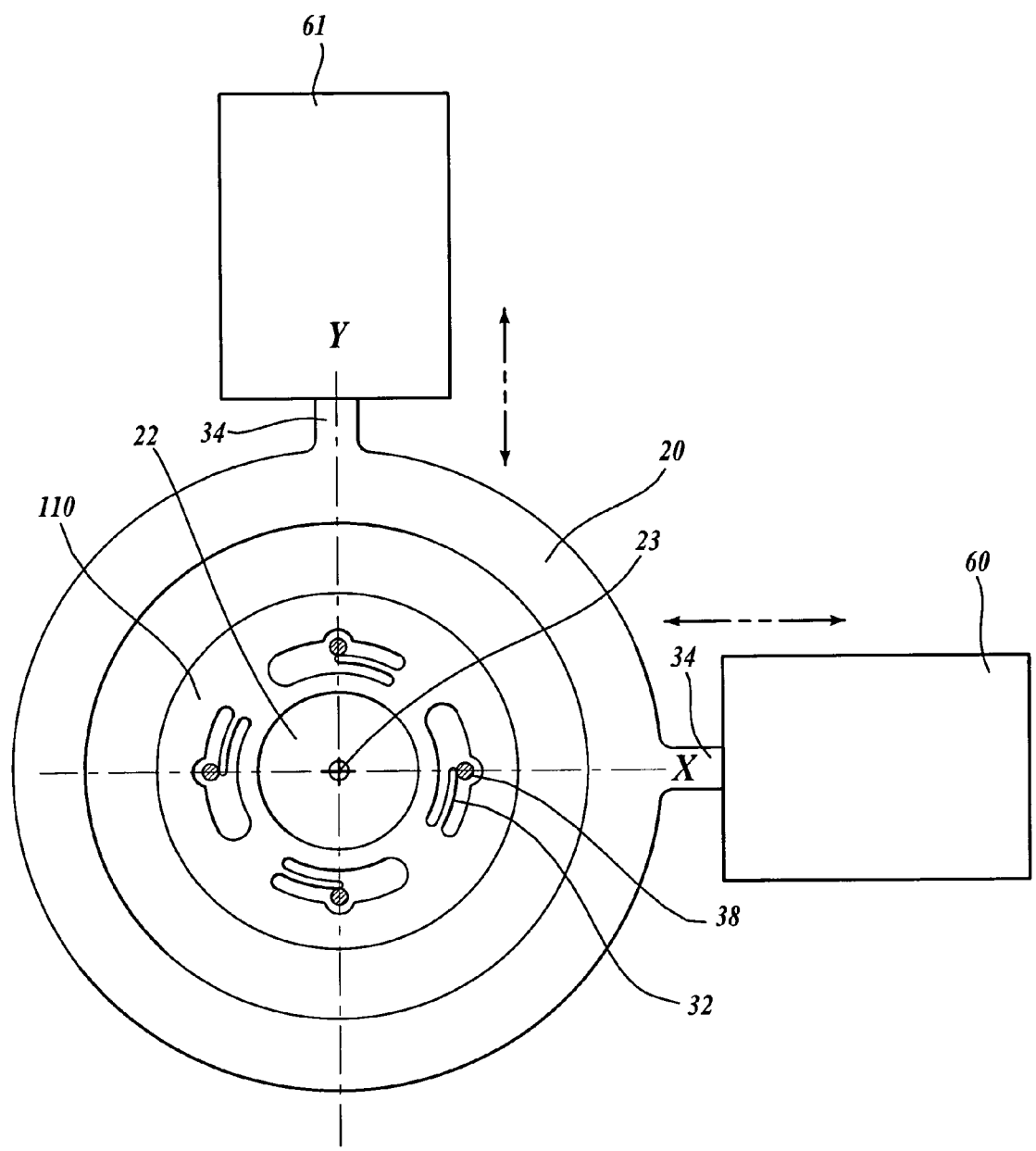
FIG. 7 is a top view of a plate including first and second actuators according to the present invention.

Referring to FIGS. 1 and 2, the plate 20 is moveably or slidably disposed relative to the nozzle throat 12. Referring to FIG. 7, the plate 20 may include first and second actuators 60 and 61. The plate 20 includes attachment arms 34 extending outwardly in a spaced relationship from the perimeter edge of the plate 20. As a non-limiting example, the attachment arms 34 are located at a 90 degree angle from one another. The attachment arms 34 are attached to the actuators 60 and 61, which are suitably located remotely from the plate 20 and the housing 8.

The actuators 60 and 61 selectively move the plate 20 in a plane substantially perpendicular to an axis 100 extending longitudinally through the plug 10. The actuators 60 and 61 move the plate 20 in both or either of the x- and y-directions of the plane to offset the center opening 22 of the plate 20 relative to the housing 8, the plug 10, and the nozzle throat 12, thereby yielding the desired asymmetrical expansion waves. The first actuator 60 moves the plate 20 along the x-axis, and the second actuator 61 moves the plate 20 along the y-axis.

Still referring to FIG. 7, the first and second actuators 60 and 61 can be dual linear actuators. Dual linear actuators transform rotary motion into linear displacements. In another embodiment, the first and second actuators 60 and 61 can be rotary actuators with dual-nested eccentric face gears. The actuators 60 and 61 also incorporate integral encoders for position feedback.

Referring to FIGS. 1 and 2, the plate 20 is moveably coupled to the housing 8 by a retention plate 24 seated rearwardly of the plate 20 to hold the plate 20 in position. Referring to FIG. 3, the retention plate 24 is (like the plate 20) a dish-shaped retention plate 24 having a planar central portion 130. The planar central portion 130 of the retention plate 24 has a planar forward surface 132. The planar forward surface 132 of the planar central portion 130 of the retention plate 24 seats against the rearward planar surface 114 of the planar central portion 110 of the plate 20. Both the plate 20 and the retention plate 24 are oriented perpendicularly to the longitudinal axis 100 of the plug 10 and the cylindrical chamber 62 within the housing 8. A second bellows seal 27 provides an annular seal between the rearward outer edge of the plate 118 and the forward outer edge of retention plate 136.

Still referring to FIG. 3, the retention plate 24, the plate 20, and the rearward portion 120 of the housing 8 are joined together by retention fasteners 138. The retention plate 24 has a series of holes 28 for receiving retention fasteners 38; the plate 20 has a series of channels 36 for receiving the fasteners 38; and. the rearward planar surface 122 of the housing 8 has a series of threaded holes 40 for receiving and securing the retention fasteners 38.

In another embodiment, the retention plate 24 can be a substantially flat retention plate that retains the thrust diverter 14. In other embodiments, the retention plate 24 is a bar, a series of bars, or any other suitable retaining member. In still another embodiment, the retention plate 24 is a magnetic plate that magnetically couples with the housing 8, allowing the plate 20 to move freely in a plane substantially perpendicular to an axis 100 extending longitudinally through the plug 10.

Still referring to FIG. 3, a plate assembly includes the following: the rear portion 120 of the housing 8, the first bellows seal 26 between the rearward portion 120 of the housing 8 and the plate 20, the plate 20, the second bellows seal 27 between the plate 20 and the retention plate 24, the retention plate 24, and the retention fasteners 38. Threaded bushings 38 are inserted through the retention plate holes 24 and the plate channels 36. The threaded bushings 38 are fixedly attached to threaded holes 40 in the housing 8. Therefore, the retention fasteners 38 fixedly connect the retention plate 24 to the housing 8 through the plate channels 36. The plate channels 36 allow the plate 20 to remain coupled to the housing 8, but to move freely around the retention fasteners 38 relative to the housing 8 in a plane substantially perpendicular to an axis 100 extending longitudinally through the plug 10.

Referring to FIGS. 1 and 2, the retention fasteners 38 are threaded bushings that connect the retention plate 24 to the housing 8. The threaded bushings preferably have a shoulder 42 (referring to FIG. 2). Threaded shoulder bushings ensure adequate spacing between the retention plate 24 and the housing 8 to allow the plate 20 to freely move in a plane substantially perpendicular to an axis 100 extending longitudinally through the plug 10, even when the retention fasteners 38 are tightly attached.

In another embodiment, retention fasteners 38 may be welded, or in any other way permanently connected, to the housing 8. For example, retention fasteners 38 protrude outwardly from the housing 8. The plate 20 is fitted onto the retention fasteners 38 through the plate channels 36, and the retention plate 24 is fitted onto the retention fasteners 38 through fitted holes 28 in the retention plate 24. The retention fasteners 38 are then attached to the retention plate 24 by a suitable method of attachment, including by welding, lock nuts, permanent adhesion, or any other suitable method.

The number of retention fasteners 38 required to couple the retention plate 24 to the housing 8 depends on the gas pressure within the plenum cavity 30. In a preferable embodiment there are eight retention fasteners 38. In another embodiment there may be four retention fasteners 38. Although in the illustrated embodiment there are four retention fasteners 38, it is appreciated that any suitable number of fasteners 38 may be used.

The number of plate channels 36 in the plate 20 depends on the number of retention fasteners 38 used. The plate channels 36 accept the retention fasteners 38, but still allow for plate 20 movement around the retention fasteners 38 to offset the center opening 22 of the plate 20 relative to the nozzle throat 12.

In one embodiment of the present invention, the thrust diverter 14 is self-centering to reposition itself to a non-thrust-vectoring position. As a non-limiting example, the plate 20 is self-centering when any forces acting on the attachment arms 34 are removed. In the illustrated embodiment of FIG. 7, the plate 20 is connected to the retention fasteners 38 by beam springs 32. The beam springs 32 bias the plate 20 back to its center position when forces from the first and second actuators 60 and 61, which selectively position the plate 20 in non-zero x- and y-coordinates, are removed. The plate 20 thus returns to its center position, concentric and in direct alignment with the nozzle throat 12, from any other non-center position.

As previously described, one embodiment of the present invention incorporates thrust gas control. Thrust gas control provides a controllably pulsed output of thrust gas at the nozzle throat 12 and is operative between full "on" and full "off" gas flow positions. Referring to FIG. 1, an electrical solenoid 70 operates a pilot stage valve 72 by opening or closing the pilot stage valve 72. When the pilot stage valve 72 is open, gas enters the pilot stage gas inlet 74, fills the pilot stage gas duct 78 and the pilot stage cavity 76, and forces the plug 10 against the nozzle throat 12 to close the annular space 16 between the plug 10 and the nozzle throat 12. The electrical solenoid 70 also operates to close the pilot stage valve 72, ceasing delivery of gas to the pilot stage cavity 76. When no gas is delivered to the pilot stage cavity 76, gas flowing into the plenum cavity 30 urges the plug 10 away from the annular rim 44 of the plenum cavity 30, creating an annular space 16 between the plug 10 and the nozzle throat 12 and allowing gas to exit from the nozzle throat 12, thereby generating thrust.

As shown in the illustrated embodiment of FIG. 1, the electrical solenoid 70 controls a pilot stage valve 72. The pilot stage valve 72, such as a poppet valve, a spool valve, or a fluidic device operated by high-pressure control fluid, or any other suitable valve.

In another embodiment, the plug 10 may be mounted on a vertical actuator that can push the plug 10 inwardly and withdraw it outwardly to open and close the nozzle throat 12. In yet another embodiment, the thrust of the rocket engine 2 may be controlled by turning the thrust gas generator on and off.

In light of the above description of the components of the thrust vector control system for a plug nozzle rocket engine, the operation of the thrust vector control system will now be described. Generally described, the thrust vector control system utilizes a thrust diverter 14 that is moveably disposed relative to the housing 8. The thrust diverter 14 is selectively moveable relative to the housing 8 to define an asymmetric surface pressure distribution along the plug 10 for thrust-vectoring. This asymmetrical distribution of pressure along the plug 10 results in the creation of an apparent thrust vector angular deflection.

Focusing in more detail on the effect of movement of the thrust diverter 14 and referring to FIGS. 4A–C, 5A–C and 6A–C, the plate 20 can be moved along a plane substantially perpendicular to an axis 100 extending longitudinally through the plug 10 in either or both the x-axis and the y-axis. Movement of the plate 20 in this manner diverts the resultant expansion waves 140 and pressure distribution on the plug 10. An asymmetric surface pressure distribution creates a moment about the thruster 2, thereby altering the net direction of the thrust vector.

Figure 4:
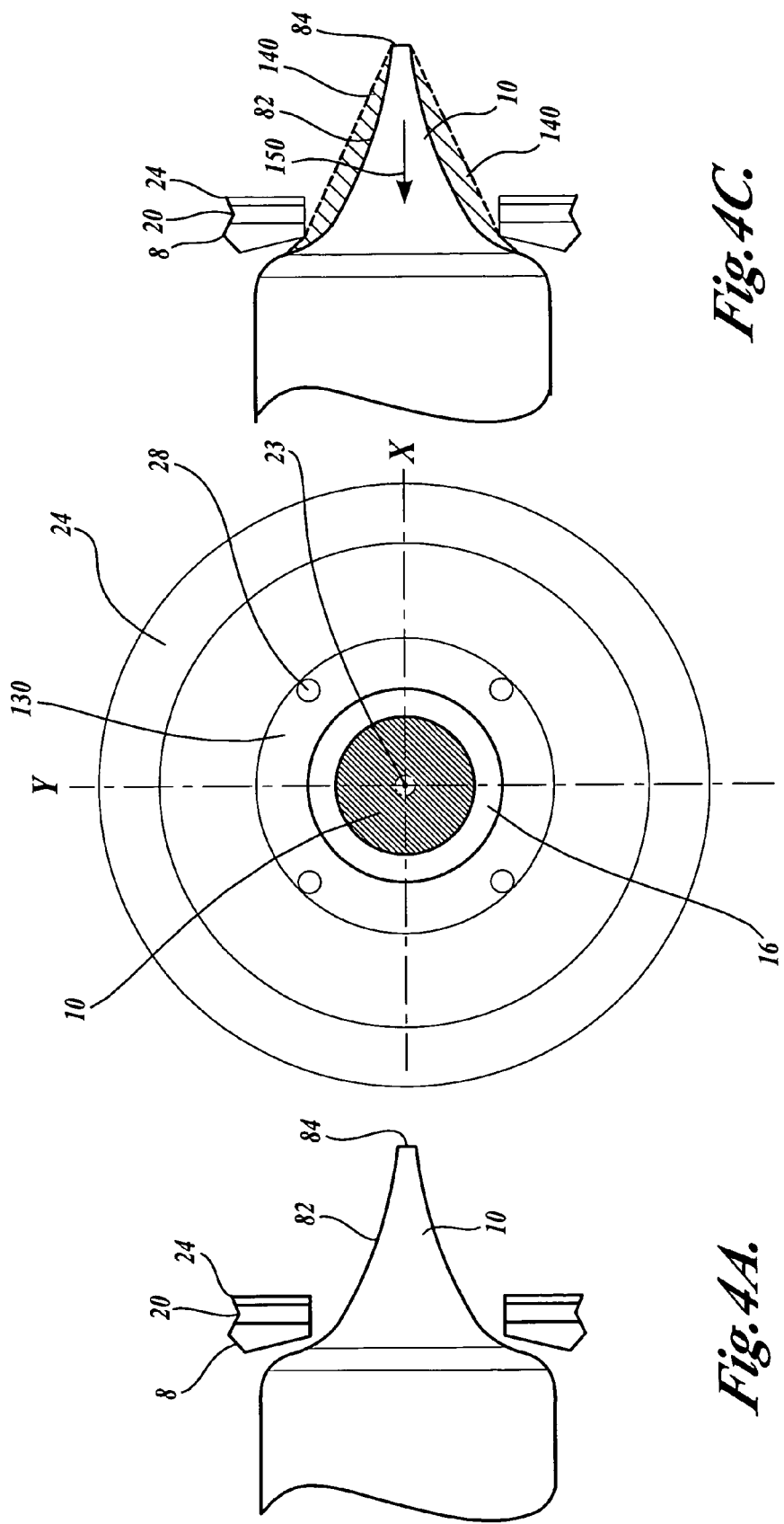
FIG. 4A is a partial cross-sectional view of the plug showing the thrust diverter in a non-thrust-vectoring position.
FIG. 4B is an end view of the plug showing the thrust diverter in the non-thrust-vectoring position.
FIG. 4C is a partial cross-sectional view of the plug and the thrust diverter, showing exemplary thrust vectors with the thrust diverter in the non-thrust-vectoring position.

Referring to FIGS. 4A, 4B, and 4C, the thrust diverter 14 can be normally biased to a non-thrust-vectoring position, in which the plate center opening 22 is centered about and in alignment with the nozzle throat 12, as shown in FIGS. 4A and 4B. In the non-thrust-vectoring position, the normal thrust vector 150 of the rocket engine 2 is coaxially aligned with an axis 100 extending longitudinally through the plug 10 and the nozzle throat 12. Referring to FIG. 4C, the normal expansion waves 140 converge on the plug 10 at equidistant points from the nozzle throat 12. Because the non-thrust-vectoring expansion waves 140 are substantially symmetrical in their convergence on the conically-shaped portion 82 of the plug 10, they do not affect the surface pressure distribution of the exhaust from the nozzle throat 12 on plug 10. The non-thrust-vectoring expansion waves 140, therefore, do not result in any thrust-vectoring of the rocket engine 2, as shown by the direction of the normal thrust vector 150 in FIG. 4C.

The plate center opening 22 is moveable to an infinite number of thrust-vectoring positions in the plane substantially perpendicular to the axis 100 extending longitudinally through the plug 10, as permitted by the limitations of the rocket engine 2.

Figure 5:
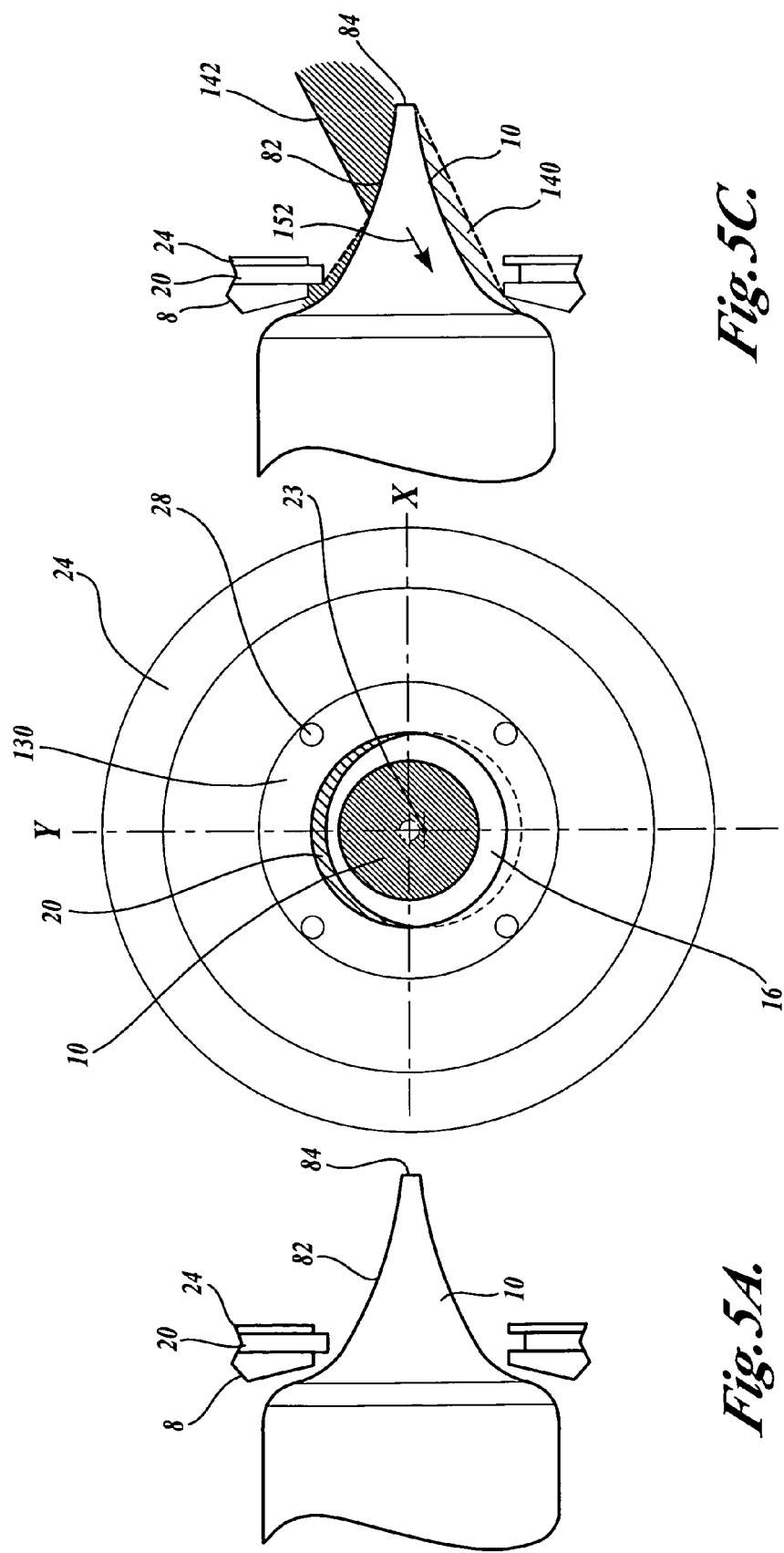
FIG. 5A is a partial cross-sectional view of the plug showing the thrust diverter in a first thrust-vectoring position.
FIG. 5B is an end view of the plug showing the thrust diverter in the first thrust-vectoring position.
FIG. 5C is a partial cross-sectional view of the plug and the thrust diverter, showing exemplary thrust vectors with the thrust diverter in the first thrust-vectoring position.

Referring to FIGS. 5A, 5B, and 5C, the thrust diverter 14 can be moved to a first thrust-vectoring position relative to the plug 10 and the nozzle throat 12. Referring to FIG. 5B, in the first thrust-vectoring position, the thrust diverter 14 has a coordinate position of negative-y and zero-x, as shown by the movement of the center point 23 of the plate center opening 22. Referring to FIGURE 5C, the asymmetrical expansion waves 142 and 140 create an asymmetrical surface pressure distribution on the plug 10. The asymmetrical surface pressure distribution on the plug 10 results in a divergent first thrust vector 152. The divergent first thrust vector 152 creates a moment about the rocket engine 2, which causes the rocket engine 2 to pitch or yaw. Therefore, when the thrust diverter 14 is positioned in the negative y-direction and zero x-direction, asymmetric pressure distribution along the plug 10 (as shown in FIG. 5C) causes the thrust direction of the rocket engine 2 to change, diverting away from the constricted area of the nozzle throat 12.

Figure 6:
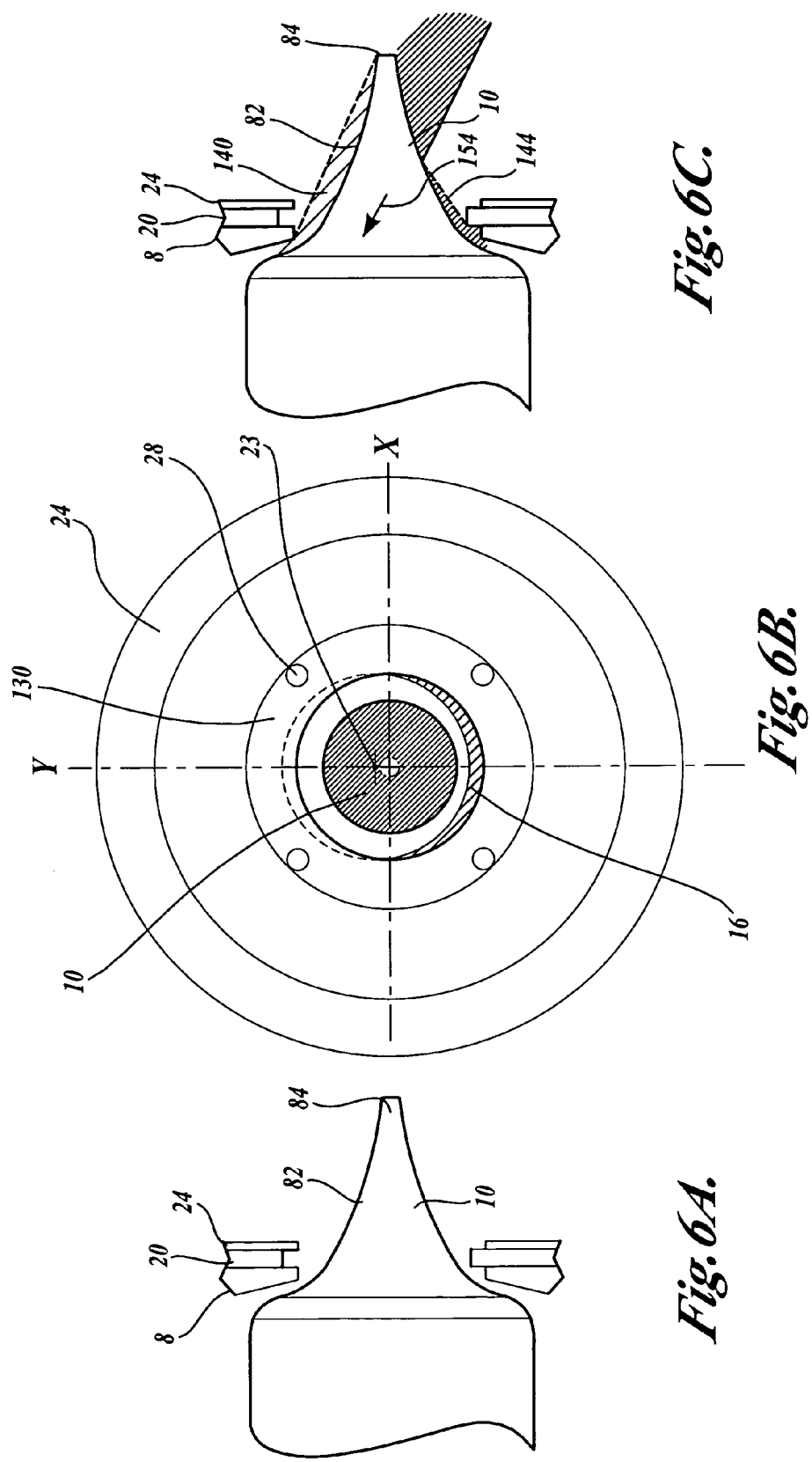
FIG. 6A is a partial cross-sectional view of the plug showing the thrust diverter in a second thrust-vectoring position.
FIG. 6B is an end view of the plug showing the thrust diverter in the second thrust-vectoring position.
FIG. 6C is a partial cross-sectional view of the plug and the thrust diverter, showing exemplary thrust vectors with the thrust diverter in the second thrust-vectoring position.

Referring to FIGS. 6A, 6B, and 6C, the thrust diverter 14 can be moved to a second thrust-vectoring position (opposite the first thrust-vectoring position) relative to the plug 10 and the nozzle throat 12. Referring to FIG. 6B, in the second thrust-vectoring position, the thrust diverter 14 has a coordinate position of positive-y and the zero-x, as shown by the movement of the center point 23 of the plate center opening 22. Referring to FIG. 6C, the asymmetrical expansion waves 144 and 140 create an asymmetrical surface pressure distribution on the plug 10. The asymmetrical surface pressure distribution on the plug 10 results in a divergent second thrust vector 154. The divergent second thrust vector 154 creates a moment about the rocket engine 2, which causes the rocket engine 2 to pitch or yaw. Therefore, when the thrust diverter 14 is positioned in the positive y-direction and the zero x-direction, asymmetric pressure distribution along plug 10 (as shown in FIG. 6C) causes the thrust direction of the rocket engine 2 to change, diverting away from the constricted area of the nozzle throat 12.

Unlike in the normal thrust-vectoring position of FIGS. 4A–C, the first and second thrust vectors 152 (as shown in FIG. 5C) and 154 (as shown in FIG. 6C) of the rocket engine 2 in respective first and second thrust-vectoring positions are not coaxially aligned with an axis 100 extending longitudinally through the plug 10 and the nozzle throat 12. Rather, the apparent rotation of the thrust vector is displaced away from the constricted area of the nozzle throat 12. The first and second thrust vectors 152 (referring to FIG. 5C) and 154 (referring to FIG. 6C) thus divert away from the constricted area of the nozzle throat 12.

FIGS. 5A–C and 6A–C are limited to plate 20 movement only in the positive and negative y-directions for simplification. The plate 20 may be positioned in any x- and y-coordinates, within the limitations of the system, to effect a change in attitude or direction of the rocket engine 360 degrees about the plug tip 84. Once the desired change in rocket engine attitude or direction is achieved, the plate 20 can be returned to its non-vectoring position (as shown in FIGS. 4A–4C).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A thrust vector control system for a plug nozzle rocket engine, comprising:
   (a) a housing having a nozzle throat;
   (b) a plug disposed relative to the housing and positioned within the nozzle throat to define a space between the plug and the nozzle throat; and
   (c) a thrust diverter slideably disposed relative to the housing to provide an asymmetric surface pressure distribution along the plug for thrust-vectoring.

2. A thrust vector control system for a plug nozzle rocket engine, comprising:
   (a) a housing having a nozzle throat;
   (b) a plug disposed relative to the housing and positioned within the nozzle throat to define a space between the plug and the nozzle throat; and (c) a thrust diverter moveably disposed relative to the housing to provide an asymmetric surface pressure distribution along the plug for thrust-vectoring, wherein the thrust diverter is slidably disposed relative to the nozzle throat.

3. The thrust vector control system of claim 1, wherein the thrust diverter is normally biased to a non-thrust-vectoring position.

4. A thrust vector control system for a plug nozzle rocket engine, comprising:
(a) a housing having a nozzle throat;
(b) a plug disposed relative to the housing and positioned within the nozzle throat to define a space between the plug and the nozzle throat; and
(c) a thrust diverter moveably disposed relative to the housing to provide an asymmetric surface pressure distribution along the plug for thrust-vectoring, wherein the thrust diverter is moveable in a plane substantially perpendicular to an axis extending longitudinally through the plug.

5. The thrust vector control system of claim 4, wherein the thrust diverter includes a plate with an opening having a diameter.

6. The thrust vector control system of claim 5, wherein the plate includes channels for receiving fasteners.

7. The thrust vector control system of claim 5, wherein the diameter of the opening is substantially equal to a diameter of the nozzle throat.

8. The thrust vector control system of claim 5, wherein the thrust diverter is self-centering to reposition the plate to a non-thrust-vectoring position.

9. A thrust vector control system for a plug nozzle rocket engine, comprising:
(a) a housing having a nozzle throat;
(b) a plug disposed relative to the housing and positioned within the nozzle throat to define a space between the plug and the nozzle throat; and
(c) a thrust diverter moveably disposed relative to the housing to provide an asymmetric surface pressure distribution along the plug for thrust-vectoring further comprising a first actuator coupled to the thrust diverter, the first actuator selectively moving the thrust diverter relative to the plug.

10. The thrust vector control system of claim 9, further comprising a second actuator coupled to the thrust diverter, the first and second actuators selectively moving the thrust diverter relative to the plug.

11. The thrust vector control system of claim 1, wherein the plug has a first end and a second end, the first end tapering inwardly toward the second end.

12. The thrust vector control system of claim 11, wherein the second end of the plug terminates downstream from the thrust diverter.

13. A thrust vector control system for a plug nozzle rocket engine, comprising:
(a) a housing having a nozzle throat;
(b) a plug disposed relative to the housing and positioned within the nozzle throat to define a space between the plug and the nozzle throat; and
(c) a thrust diverter moveably disposed relative to the housing to provide an asymmetric surface pressure distribution along the plug for thrust-vectoring, wherein the plug is moveable within the housing between an open position and a closed position relative to the nozzle throat.

14. A thrust vector control system for a plug nozzle rocket engine, comprising:
(a) a housing having a nozzle throat;
(b) a plug translationally mounted within the housing and positioned within the nozzle throat to define a space between the plug and the nozzle throat; and
(c) a thrust diverter slideably disposed relative to the housing to angularly deflect thrust relative to the plug for thrust-vectoring.

15. The thrust vector control system of claim 14, wherein the thrust diverter is normally biased to a non-thrust-vectoring position.

16. A thrust vector control system for a plug nozzle rocket engine, comprising:
(a) a housing having a nozzle throat;
(b) a plug translationally mounted within the housing and positioned within the nozzle throat to define a space between the plug and the nozzle throat; and
(c) a thrust diverter moveably disposed relative to the housing to angularly deflect thrust relative to the plug for thrust-vectoring, wherein the thrust diverter is moveable in a plane substantially perpendicular to an axis extending longitudinally through the plug.

17. The thrust vector control system of claim 16, wherein the thrust diverter includes a plate with an opening having a diameter.

18. The thrust vector control system of claim 17, wherein the diameter of the opening is substantially equal to a diameter of the nozzle throat.

19. The thrust vector control system of claim 17, wherein the thrust diverter is self-centering to reposition the plate to a non-thrust-vectoring position.

20. A thrust vector control system for a plug nozzle rocket engine, comprising:
(a) a housing having a nozzle throat;
(b) a plug translationally mounted within the housing and positioned within the nozzle throat to define a space between the plug and the nozzle throat; and
(c) a thrust diverter moveably disposed relative to the housing to angularly deflect thrust relative to the plug for thrust-vectoring, further comprising a first actuator coupled to the thrust diverter, the first actuator selectively moving the thrust diverter relative to the plug.

21. The thrust vector control system of claim 20, further comprising a second actuator coupled to the thrust diverter, the first and second actuators selectively moving the thrust diverter relative to the plug.

22. A thrust vector control system for a plug nozzle rocket engine, comprising:
(a) a housing having a nozzle throat;
(b) a plug translationally mounted within the housing and positioned within the nozzle throat to define a space between the plug and the nozzle throat; and
(c) a thrust diverter moveably disposed relative to the housing to angularly deflect thrust relative to the plug for thrust-vectoring, wherein the plug is moveable within the housing between an open position and a closed position relative to the nozzle throat.

23. A thrust vector control system for a plug nozzle rocket engine, comprising:
(a) means for generating thrust;
(b) means for controlling the thrust, the means for controlling the thrust being operative between full on and full off flow positions; and
(c) means for thrust-vectoring, the means for thrust-vectoring slideably disposed relative to the housing to selectively produce an apparent angular thrust vector deflection by introducing surface pressure asymmetry along the length of a plug.

24. A thrust vector control system for a plug nozzle rocket engine, comprising:
   (a) a housing having a nozzle throat;
   (b) a plug disposed relative to the housing and positioned within the nozzle throat to define a space between the plug and the nozzle throat, wherein the plug is moveable within the housing between an open position and a closed position relative to the nozzle throat;
   (c) a thrust diverter, including a plate having an opening with a diameter, a first actuator coupled to the plate, and a second actuator coupled to the plate;
   (d) the plate being moveably disposed relative to the housing in a plane substantially perpendicular to an axis extending longitudinally through the plug;
   (e) the plate being normally biased to a non-thrust-vectoring position;
   (f) the first and second actuators selectively moving the plate relative to the housing; and
   (g) the plate being moveable to a thrust-vectoring position, wherein when the plate is in a thrust-vectoring position, the plate defines an asymmetric surface pressure distribution along the plug.

* * * * *